July 18, 1933.  J. R. SADLEIR  1,918,566
POULTRY WATERER
Filed March 21, 1932
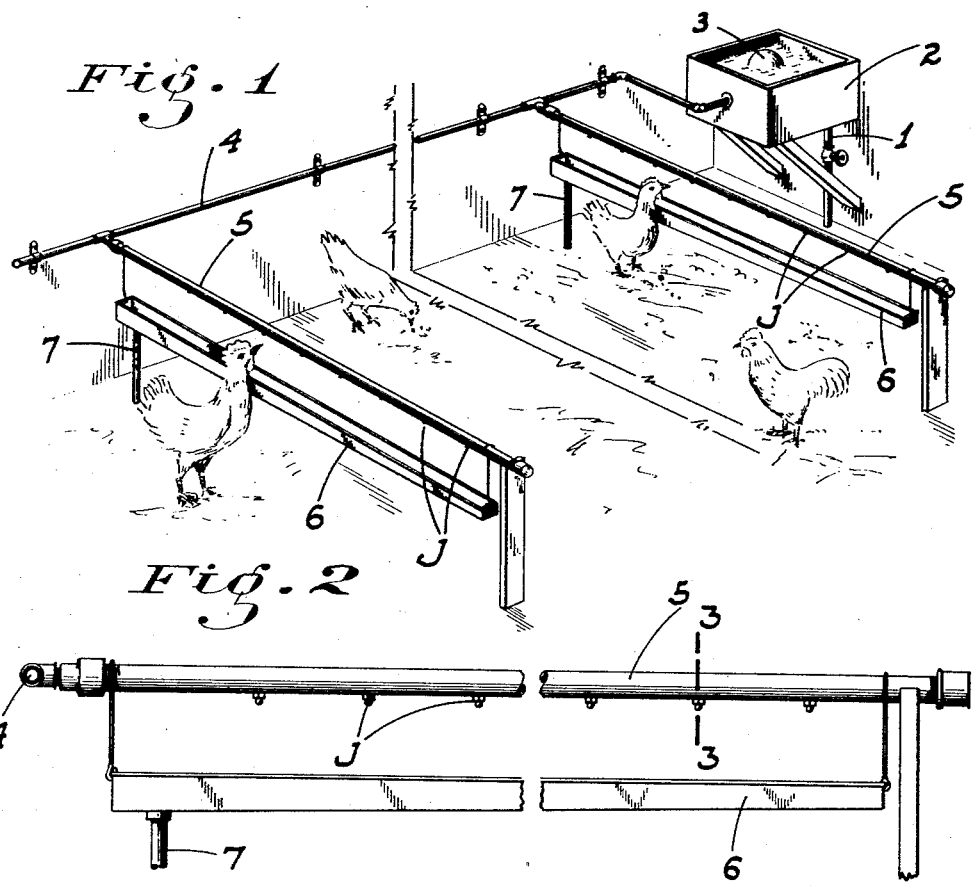
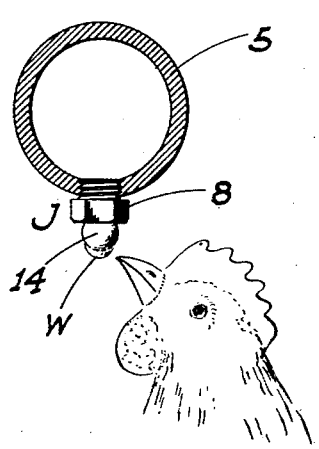
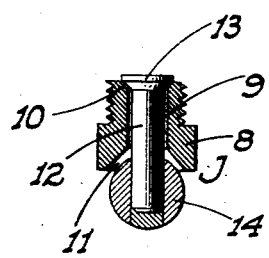
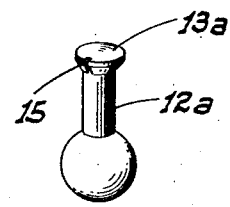
INVENTOR
J. R. Sadleir
BY
ATTORNEY Patented July 18, 1933

1,918,566

UNITED STATES PATENT OFFICE

JAMES ROBERT SADLEIR, OF SACRAMENTO, CALIFORNIA

POULTRY WATERER

Application filed March 21, 1932. Serial No. 600,079.

This invention relates to poultry watering apparatus, the objects being two-fold. One object is to provide a watering system which may be installed in a poultry house or yard of any length from a few feet to several hundred with equal effectiveness and so as to take adequate care of the needs of the corresponding flock of poultry without any crowding of the same while they are drinking. The other object is to provide a special form of nozzle or drinking jet which will not only conserve water and normally maintain the supply enclosed and uncontaminated until it is actuatally used, but is an important feature in contributing to the simplicity and successful use and operation of the system as a whole. This is especially the case since the employment of these jets in connection with the system eliminates the need of the poultryman shutting off or turning on the water at any time, while insuring that there will be no waste.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a fragmentary perspective view of the complete watering system as installed and in operation.

Fig. 2 is a side elevation of a watering unit of the system.

Fig. 3 is a full sized cross section on the line 3—3 of Fig. 2 showing one of the jets of the unit.

Fig. 4 is an enlarged sectional elevation of a jet.

Fig. 5 is a perspective view of a modified form of jet valve detached.

Referring now more particularly to the characters of reference on the drawing, the system comprises a water supply pipe 1 connected to a source of water under pressure such as a city main or elevated tank. This pipe discharges into a small tank 2 mounted in the poultry house, which tank has a valve controlled by a float 3 so that the water will be maintained at a certain level in said tank. The ordinary toilet flush tank and float valve unit may be utilized for this purpose.

Leading from the tank just a slight distance below the full level line of the tank is a horizontal pipe 4, the length of which depends on the length of the poultry house in which the system is installed. Leading from the pipe 4 at intervals are lateral relatively large pipes 5 of desired length, which extend transversely of the poultry house. Self-closing drinking jets indicated generally at J depend from each pipe 5 at intervals, there being a downwardly sloping drain trough 6 under each pipe 5 and its row of jets with a drain pipe 7 depending from the lower end of the trough.

Each jet J comprises a body 8 screwed into the pipe 5 and having a vertical bore 9 therethrough. A tapering valve seat 10 is formed at the upper end of the bore while its lower end terminates in a wide flaring portion 11. A stem 12 fits loosely in the bore and has a valve head 13 on its upper end to cooperate with and normally engage the seat 10 from above. On the lower end of the stem, mainly below the body but projecting into the flared opening 11 is a ball 14 of polished metal such as brass or chromium plate.

The pipes 5 are installed so that the fowls may reach the balls with their beaks while standing on the ground or floor. In operation the fowls will peck at the polished balls or at the glistening globules of water W draining from but hanging to the balls as indicated in Fig. 3, since anything of this nature attracts fowls and they invariably peck at it. This pecking will tilt or lift the valve off its seat with the result that the water will run down the valve stem in a quantity sufficient to take care of the immediate drinking needs of the individual fowl. The lifting or tilting pressure imparted to the valve by the pecking of a fowl is of course very small but it is adequate for the purpose on account of the fact that the water in the pipes 5 is under practically no pressure and the valve is thus held closed only by its own weight which is not great.

The ball 14 projecting into the flare 11 serves two purposes. In the first place, it limits the upward travel or lateral tilting of the stem to a very small movement, which imparts a corresponding slight opening to the valve, as is desirable in conserving water. In the second place, the flare closely overhanging the ball, said ball when tilted will engage the flare at one point or another and all water draining down the base of the body will be caught by the ball.

This lack of water pressure is assured at all times regardless of the pressure in the said pipe 1 by the fact that the pipe 4 takes off from the tank only a sufficient distance below the water in the tank to insure the pipe 4 and the various pipes 5 remaining full. Since the pipe 4 and the pipes 5 are horizontal at all points the pressure condition in said pipes 5 will be the same regardless of their distance from the tank 2. The number of lateral pipe and jet units which may be employed in any one system, with one float controlled supply tank will be thus governed solely by the size of the particular poultry house so that sufficient jets will be provided for the use of the poultry without them crowding or having to concentrate in any certain given points in the house area in order to obtain a drink.

The glistening globules of water hanging on the jet balls aid in attracting the attention of the fowls thereto. In order to maintain these globules in hot or very dry weather I may if desired provide the heads 13a of the valve stems 12a with bleed slits 15 so that a slight drainage of water will constantly run down the valve stems onto the balls even though the valves themselves are closed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A poultry watering device comprising a supply tank having means associated therewith to maintain a supply of water therein at a given level, a horizontal pipe extending from said tank and connected thereto at a point only slightly below said water level, a plurality of horizontal lateral pipes connected to said first named pipe at intervals, and normally closed poultry-actuated drinking jets depending from said lateral pipes at intervals.

2. A poultry drinking jet comprising a body adapted to be secured in and depend from a water supply member, said body having a vertical bore provided at its upper end with a valve seat, and formed at its lower end with an outward flare, a valve-head to engage said seat from above; a stem depending from the head and having a loose fit in the bore, and a ball on the lower end of the stem projecting into the flare of the bore with a clearance fit.

3. A poultry watering device comprising a supply tank having means associated therewith to maintain a supply of water therein at a given level, a horizontal pipe closed at one end and having communication at the other end with the tank at a level only slightly below the water level therein, and normally closed poultry actuated drinking jets depending from said pipe in spaced relation.

JAMES ROBERT SADLEIR.